No. 889,354. PATENTED JUNE 2, 1908.
H. M. BROOKFIELD.
PROCESS FOR FEEDING MOLTEN GLASS FOR MAKING GLASS INSULATORS
OR SIMILAR ARTICLES.
APPLICATION FILED JUNE 13, 1906.
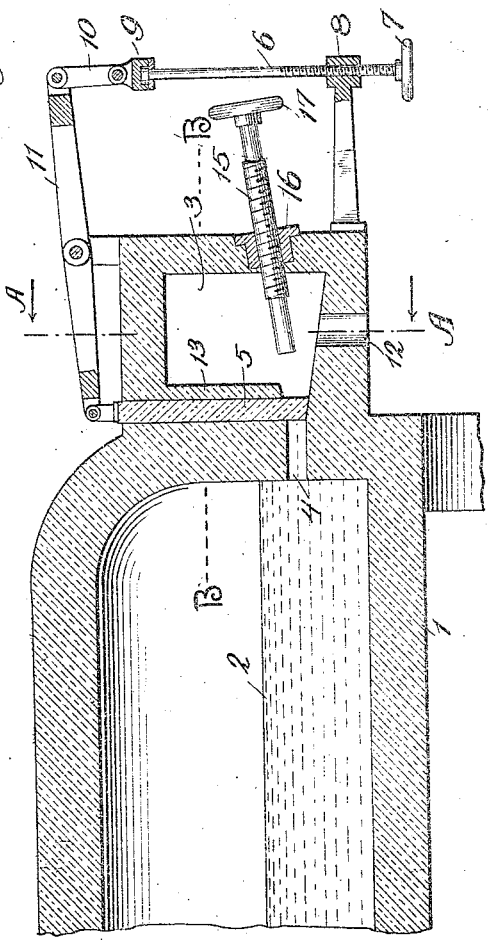
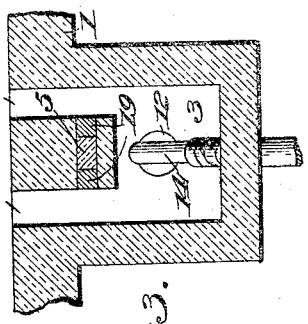
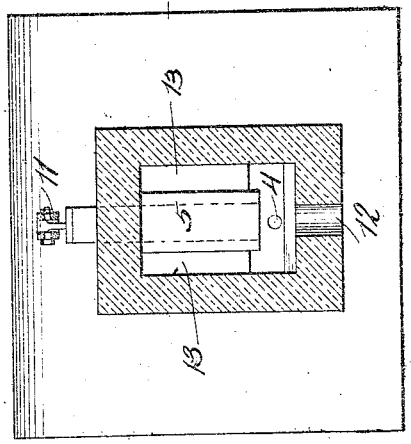
WITNESSES:
D. Harold Bush
John O. Gempler
INVENTOR
Henry M. Brookfield,
BY
Kenyon & Kenyon,
his ATTORNEYS

UNITED STATES PATENT OFFICE.

HENRY M. BROOKFIELD, OF NEW YORK, N. Y., ASSIGNOR TO BROOKFIELD GLASS COMPANY, A CORPORATION OF NEW YORK.

PROCESS FOR FEEDING MOLTEN GLASS FOR MAKING GLASS INSULATORS OR SIMILAR ARTICLES.

No. 889,354.

Specification of Letters Patent.

Patented June 2, 1908.

Application filed June 13, 1906. Serial No. 321,446.

*To all whom it may concern:*

Be it known that I, HENRY M. BROOKFIELD, a citizen of the United States, and a resident of New York, in the county of New York and State of New York, have invented a certain new and useful Improvement in Processes for Feeding Molten Glass for Making Glass Insulators or Similar Articles, of which the following is a specification.

My invention relates to improved processes for automatically feeding molten glass from a glass furnace for the manufacture of glass insulators and other similar small glass articles.

It has for its object to provide a process for automatically feeding molten glass in such a relatively small stream as to be adapted for the automatic manufacture of glass insulators or other similar small glass articles, and to do this without the clogging or freezing of the glass.

It consists of the novel process herein shown and described.

In the drawings accompanying this specification and forming part hereof, I have shown parts of a glass furnace adapted for use in carrying out my improved process. It will be understood of course, that any other suitable apparatus may be employed for this purpose. That shown in the drawings is, however, well adapted for carrying out my improved process.

I will now proceed to describe my improved process as it is used in connection with the specific apparatus shown in the drawings.

Referring to these drawings, Figure 1 is a longitudinal section through a part of a glass furnace adapted for carrying out my improved process; Fig. 2 is a vertical cross-section on the line A—A of Fig. 1, viewed as shown by the arrow; Fig. 3 is a horizontal cross-section on the line B—B of Fig. 1.

Heretofore in the practical art of handling molten glass for the manufacture of glass insulators or other similar small glass articles, it has been the practice to take the molten glass out of the furnace by hand. Attempts have been made in such manufacture to cause molten glass to flow through openings in the side of the furnace, but, as far as I am aware, such efforts have failed. The chief difficulty lies in the fact that in such cases the glass must flow out through the opening and usually over surfaces more or less cold, and must flow in a relatively small stream to be adapted for the manufacture of glass insulators. At the usual temperatures employed with molten glass for use in the manufacture of glass insulators, it is difficult for the glass to flow out of such a small opening as would be required to give the sufficiently small stream required, and such a small stream chills quickly as it starts to flow out of the opening and over the said surfaces. I have discovered that, if the opening for the discharge of the glass from the furnace is made relatively large at the beginning, the flow of molten glass will be more readily started, and after a flow has been thus secured, that the opening can then be reduced to the proper size for giving the exact size of stream required. I have found, in many cases, that it is practically impossible to start the flow of a stream of glass where the opening is of just the right size to maintain a proper stream for use in the manufacture of glass insulators, but where the opening is made considerably larger than such a size at the beginning, the flow of glass is readily started, and this flow can thereafter be successfully maintained, although the size of the opening and the size of the flow are reduced to the proportions desired. The flow, having once been started, is maintained notwithstanding such reduction in size.

I will now proceed to describe the apparatus shown in the drawings, and explain my improved process in connection therewith.

1 represents a glass furnace and 2 the molten glass therein. This furnace is provided at one side with a heating chamber 3, a channel 4 connecting the interior of the furnace with the chamber and providing a means for the flow of the molten glass from the former to the latter. The channel 4 is preferably located at some distance below the normal level of the molten glass in the furnace in order that the molten glass drawn off may be drawn from a point at some distance below the surface to avoid taking the impurities which generally float upon the top of the molten glass. It is also preferably located at a sufficient distance above the bottom of the furnace to insure that the molten glass shall be sufficiently liquid to flow properly. In practice, I prefer to arrange it about as shown in the drawing.

5 is a valve gate for closing and opening channel 4 and for regulating the flow of the molten glass through the same. Any suitable means may be employed for moving this gate. In the form shown, it is made vertically reciprocating and is controlled through a screw-threaded rod 6 provided with a hand-wheel 7 and passing through a support 8 interiorly screw-threaded and connected at its upper end through rounded head 9 to a link 10 pivoted at its upper end to a lever 11, to which is pivoted at its other end, valve-gate 5, as shown in Fig. 1. The rounded head 9 of rod 6 is seated in a similar shaped cavity in the lower part of link 10, and is free to turn therein. By turning hand-wheel 7 in one direction or the other, valve-gate 5 can be delicately and accurately adjusted to vary the size of opening 4 and to control the flow of molten glass from the furnace or to shut it off altogether.

12 is a discharge orifice leading from chamber 3 for discharging the molten glass. In its flow through channel 4 to and through orifice 12, the molten glass necessarily passes over a considerable extent of brick, and if no means for heating or keeping this length of brick heated were employed, the molten glass would congeal and clog channel 4 and utterly prevent the discharge of molten glass from the furnace. To avoid this, I use means for keeping such surfaces heated over which the glass must pass in its flow, and sufficiently so to maintain the fluidity of the glass. Any suitable means may be employed for this purpose. I prefer to use for this purpose, a heating chamber 3 which will sufficiently cover and protect the parts over which the glass must flow, sufficiently heating them to prevent their congealing the molten glass. This chamber may assume any suitable form. In the drawing, it is shown as an inclosed box or rectangular apartment, although it is not absolutely necessary that it be inclosed on all sides, as long as it affords sufficient means for protecting the surfaces in question from becoming chilled or for keeping them sufficiently heated. I prefer to employ means for heating this chamber. Any suitable means may be employed for that purpose. As shown, I heat it directly from the interior of furnace 1 by means of openings 18, shown in Figs. 2 and 3, which pass through the wall of the furnace from the interior into chamber 3. It is not necessary, however, to heat this chamber from the furnace, as it may, for example, be heated independently, as by oil jets placed therein, or by any other suitable heating means.

As chamber 3 is kept very hot, and as the heat rapidly affects and destroys a valve-gate, such as 5, I preferably place a guard 13 in front of the valve-gate 5 so that no part of the valve-gate is exposed, except the extreme lower edge. This guard 13 may be made of any suitable material. As shown, it has sides 19 which overlap and cover the edges of gate 5, as shown in Fig. 3.

As it is necessary at times to remove valve-gate 5 for purposes of repair or for replacing it with another valve-gate, I preferably provide means for temporarily stopping the flow of glass from the furnace while the valve-gate is out of operative position. For this purpose, I provide a stopper 14 which, in the form shown, consists of a rod screw-threaded at 15 and passing through a support 16 located in the walls of chamber 3 and interiorly screw-threaded and also provided with a hand-wheel 17. The inner end of stopper 14 is made of such shape as to enter and fit exactly the outer end of channel 4, and when 17 is turned in one direction this stopper 14 will fill channel 4 at its outer end and effectually prevent any further flow of molten glass. Stopper 14 may itself be used as a valve, if desired.

The hand wheel 7 and the parts connecting it with the valve gate 5, enable that gate to be moved up or down to vary the size of the opening 4, and thus to regulate the amount of flow therethrough. In practice gate 5 is raised to permit a flow through opening 4 for its whole extent. After this flow has been started, hand wheel 7 is turned so as to reduce the size of the opening 4 and consequently the amount of flow to just the exact proportion of stream best suited for the manufacture of glass insulators. The flow in this reduced volume will, however, be maintained. Valve gate 5 and its hand wheel 7 and connecting parts, enable the size of opening and the amount of flow of molten glass, to be regulated in accordance with the conditions of fluidity and temperature of the molten glass.

By means of my improved process, it is made possible to automatically feed molten glass from a furnace for use in the manufacture of glass insulators and other similar small glass articles.

What I claim as new and desire to secure by Letters Patent, is:

1. The process of feeding molten glass from a furnace for the manufacture of glass insulators or other similar small glass articles, which consists in first causing the molten glass to flow from the furnace in a relatively large stream, sufficiently large to prevent the clogging of such stream as it starts to flow over the relatively cool surfaces of the outlet from the furnace, heating such surfaces by means of the flow of such relatively large stream, and thereafter reducing the amount of such flow to suitable proportions for the manufacture of such articles.

2. The process of feeding molten glass from a furnace for the manufacture of glass insulators or other similar small glass articles, which consists in first causing the molten glass to flow from the furnace in a relatively large stream, sufficiently large to prevent the clogging of such stream as it starts to flow over the relatively cool surfaces of the outlet from the furnace, heating such surfaces by means of the flow of such relatively large stream, and thereafter regulating the amount of such flow in accordance with the conditions of fluidity and temperature of the glass to enable a proper flow to be maintained for the manufacture of such articles.

In testimony whereof, I have signed my name to this specification, in the presence of two subscribing witnesses.

HENRY M. BROOKFIELD.

Witnesses:
BERTRAM M. DOWNS,
EDWIN SEGER.